US010666344B2

(12) United States Patent
Kim et al.

(10) Patent No.: US 10,666,344 B2
(45) Date of Patent: May 26, 2020

(54) METHOD AND ELECTRONIC DEVICE FOR CONFIGURING RADIO FREQUENCY SETTING

(71) Applicant: Samsung Electronics Co., Ltd, Suwon-si (KR)

(72) Inventors: Sung Soo Kim, Suwon-si (KR); Min Chull Paik, Suwon-si (KR); Hyoungjoo Lee, Suwon-si (KR); Hyun Hoon Ha, Suwon-si (KR); Won Hyung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/699,575

(22) Filed: Sep. 8, 2017

(65) Prior Publication Data
US 2018/0069616 A1 Mar. 8, 2018

(30) Foreign Application Priority Data
Sep. 8, 2016 (KR) .......................... 10-2016-0115903

(51) Int. Cl.
H04B 7/08 (2006.01)
H04L 5/00 (2006.01)
H04B 7/06 (2006.01)

(52) U.S. Cl.
CPC ........... *H04B 7/0814* (2013.01); *H04L 5/001* (2013.01); *H04L 5/0023* (2013.01); *H04B 7/0691* (2013.01); *H04L 5/0098* (2013.01)

(58) Field of Classification Search
CPC ..... H04L 5/001; H04L 5/0023; H04L 5/0098; H04B 7/0814; H04B 7/0691
See application file for complete search history.

(56) References Cited

U.S. PATENT DOCUMENTS

| 10,050,686 B2* | 8/2018 | Vook .................... H04B 7/0469 |
| 2011/0261704 A1 | 10/2011 | Etemad |
| 2013/0016633 A1 | 1/2013 | Lum et al. |
| 2013/0077522 A1* | 3/2013 | Iyama ................. H04W 52/225 370/252 |

(Continued)

FOREIGN PATENT DOCUMENTS

| KR | 10-2017-0141016 A | 12/2017 |
| WO | 2015042594 A2 | 3/2015 |

OTHER PUBLICATIONS

International Search Report and Written Opinion regarding International Application No. PCT/KR2017/009605, dated Dec. 21, 2017, 14 pages.

(Continued)

*Primary Examiner* — Kabir A Timory

(57) ABSTRACT

An electronic device includes a communication circuit, a plurality of antennas that are fed with power from the communication circuit, and a processor that controls the communication circuit. The processor is configured to receive a first signal for indicating initiation of configuration for carrier aggregation. The processor is also configured to change the configuration of at least one of the antennas or the communication circuit to perform the carrier aggregation if a second signal for indicating operation initiation of the carrier aggregation is received from a base station.

20 Claims, 12 Drawing Sheets

(56) References Cited

U.S. PATENT DOCUMENTS

| | | |
|---|---|---|
| 2013/0084915 A1* | 4/2013 | Asuri .................. H04B 1/0064 |
| | | 455/552.1 |
| 2014/0254521 A1 | 9/2014 | Fong et al. |
| 2014/0307599 A1 | 10/2014 | Rousu |
| 2015/0156733 A1* | 6/2015 | Han .................... H04W 52/146 |
| | | 370/329 |
| 2015/0230206 A1 | 8/2015 | Tabet et al. |
| 2016/0233915 A1 | 8/2016 | Tai et al. |
| 2017/0359113 A1 | 12/2017 | Lee et al. |

OTHER PUBLICATIONS

Supplementary European Search Report dated Jun. 6, 2019 in connection with European Patent Application No. 17 84 9028, 8 pages.

\* cited by examiner

METHOD AND ELECTRONIC DEVICE FOR CONFIGURING RADIO FREQUENCY SETTING

CROSS-REFERENCE TO RELATED APPLICATION(S)

This application is related to and claims priority to Korean Patent Application No. 10-2016-0115903, filed Sep. 8, 2016, the entire disclosure of which is hereby incorporated by reference.

TECHNICAL FIELD

Embodiments disclosed in this disclosure relate to a method and an electronic device for configuring radio frequency setting.

BACKGROUND

Recently, as a mobile communication technology is developed, an electronic device has accessed a wired/wireless communication network. For example, a portable electronic device, such as a smartphone or a tablet personal computer (PC), is equipped with an antenna for transceiving a wireless signal to access the wireless communication network.

The antenna may be implemented by attaching, welding, or plating a metallic pattern to an injection-molded product, which is formed of synthetic resin and has a specified thickness and a specified volume, or may be implemented, with a conductive pattern formed on a flexible printed circuit board (FPCB). To this end, there may be used a laser direct structuring (LDS) technique using a laser and a PCB embedded antenna (PEA) formed by directly designing a pattern on a PCB.

The electronic device equipped with the antenna may support carrier aggregation (CA) of making communication using at least two frequency bands.

CA and standalone communication configuration in the electronic device may be determined depending on the reception state of a "CA configured" signal from a base station. However, although the "CA configured" signal is received, the electronic device may make standalone communication under the CA communication configuration. Accordingly, it may be difficult to expect the optimal performance of the antenna, which is appropriate to each communication configuration.

SUMMARY

To address the above-discussed deficiencies, it is a primary object to address at least the above-mentioned problems and/or disadvantages and to change the communication configuration of an antenna and/or a communication circuit according to a "CA active" signal or a "CA inactive" signal instead of a "CA configured" signal. Embodiments disclosed in this disclosure are to provide a method and an electronic device for configuring a communication circuit and/or an antenna of the electronic device adapted to a communication mode (e.g., standalone communication or CA communication) in which the electronic device actually operates.

According to an embodiment of this disclosure, an electronic device may include a communication circuit, a plurality of antennas that are fed with power from the communication circuit, and a processor that controls the communication circuit. The processor may be configured to receive a first signal for indicating initiation of configuration for carrier aggregation, and change configuration of at least one of the antennas or the communication circuit to perform the carrier aggregation if a second signal for indicating operation initiation of the carrier aggregation is received from a base station.

In addition, according to an embodiment of this disclosure, a communication method may include receiving a first signal for indicating initiation of configuration for carrier aggregation and changing configuration of at least one of the antennas or the communication circuit to perform the carrier aggregation if a second signal for indicating operation initiation of the carrier aggregation is received from a base station.

Other aspects, advantages, and salient features of the disclosure will become apparent to those skilled in the art from the following detailed description, which, taken in conjunction with the annexed drawings, discloses various embodiments of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
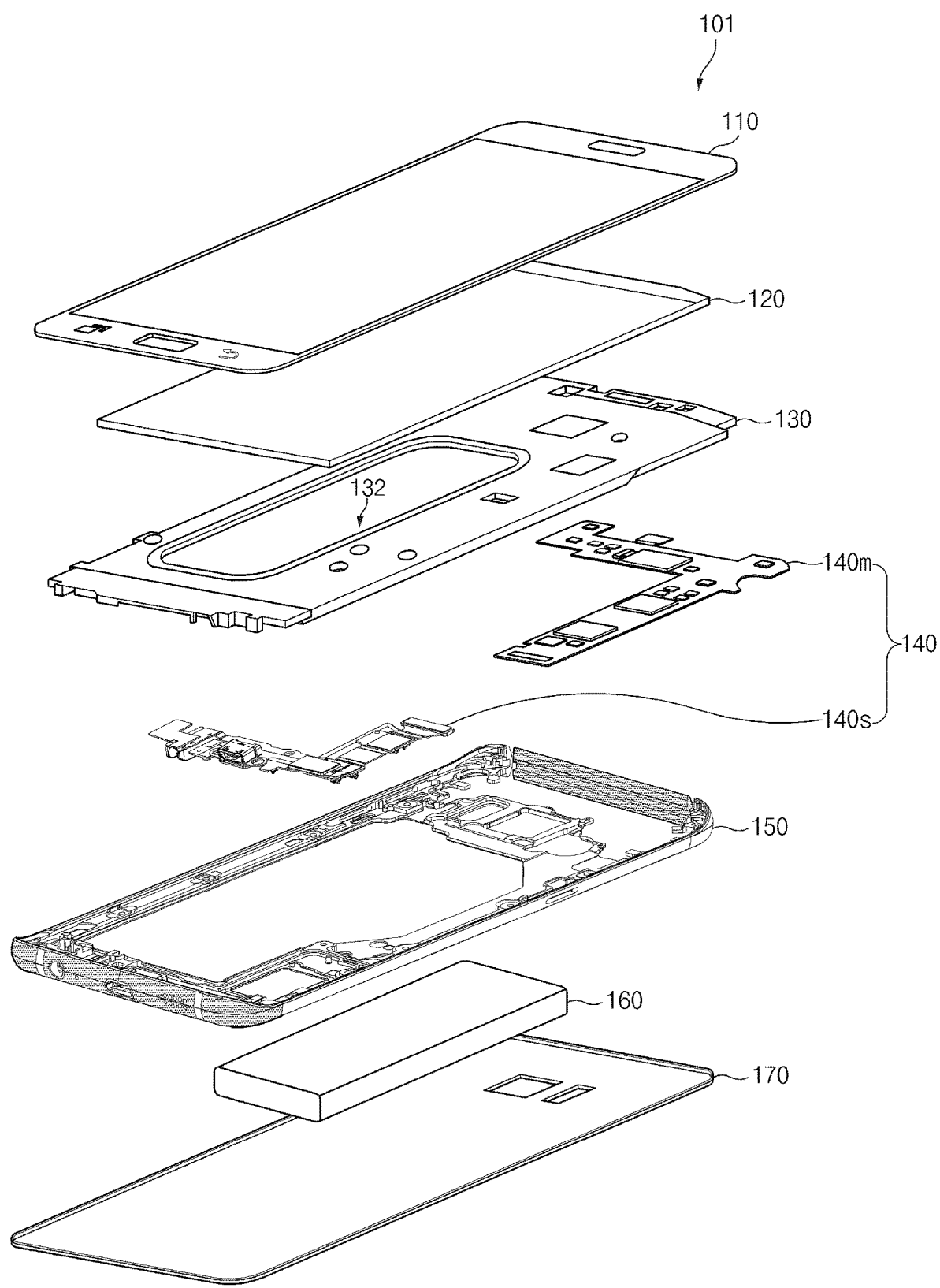
FIG. 1 illustrates an exploded perspective view of an electronic device, according to an embodiment of the present disclosure.

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of this disclosure will be described with reference to accompanying drawings. Accordingly, those skilled in the art will recognize that modification, equivalent, and/or alternative on the various embodiments described herein can be variously made without departing from the scope and spirit of this disclosure. With regard to description of drawings, similar elements may be marked by similar reference numerals.

In this disclosure, the expressions "have", "may have", "include" and "comprise", or "may include" and "may comprise" indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or the priority. For example, without departing the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as being customary in the relevant art and not in an idealized or overly formal unless expressly so defined in various embodiments of this disclosure. In some cases, even if certain terms are defined in this disclosure, they may not be interpreted to exclude embodiments of this disclosure.

An electronic device according to various embodiments of this disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an exploded perspective view of an electronic device, according to an embodiment.

Referring to FIG. 1, according to an embodiment, an electronic device 101 may include a cover glass 110, a display 120, a bracket 130, a circuit board 140, a rear housing 150, a battery 160, and/or a back cover 170. According to various embodiments, the electronic device 101 may not include some of elements illustrated in FIG. 1, and may additionally include an element which is not illustrated in FIG. 1.

The cover glass 110 may transmit light generated from the display 120. In addition, a user may touch a portion (e.g., a finger) of his/her body on the cover glass 110 to perform a "touch" (including a contact using an electronic pen). The cover glass 110 may be formed of, for example, tempered glass, reinforced plastic, a flexible polymer material, or the like to protect elements included in the display 120 or an electronic device 101 from an external shock. According to various embodiments, the cover glass 110 may be also referred to as a "glass window". The cover glass 110 may constitute a front housing of the electronic device 101.

The display 120 may be disposed below the cover glass 110 or may be coupled to the cover glass 110. Accordingly, the display 120 may be exposed through at least a portion of the cover glass 110. The display 120 may output content (e.g., a text, an image, a video, an icon, a widget, a symbol, or the like) or may receive a touch input (including a touch, a gesture, a hovering, and a force touch) from a user. To this end, the display 120 may include, for example, a display panel, a touch panel, and/or a pressure sensor. A thin film, a sheet, or a plate, which is formed of copper (Cu) or graphite, may be disposed on the rear surface of the display 120.

According to one embodiment, the display panel of the display 120 may include, for example, a liquid crystal display (LCD) panel, a light emitting diode (LED) display panel, an organic LED (OLED) display panel, a microelectromechanical systems (MEMS) display panel, or an electronic paper display panel. For example, the touch panel included in the display 120 may include a capacitive touch panel, a pressure sensitive touch panel, a resistive touch panel, an infrared touch panel, or an ultrasonic touch panel.

The bracket 130, which is formed of a magnesium (Mg) alloy, may be disposed below the display 120 and above the circuit board 140. The bracket 130 may be coupled to the display 120 and the circuit board 140 to physically support the display 120 and the circuit board 140. In addition, according to an embodiment, a swelling gap 132 may be formed in the bracket 130 in consideration of swelling of the battery 160 due to aged deterioration.

The circuit board 140 may include, for example, a main circuit board 140m and a sub-circuit board 140s. According to an embodiment, the main circuit board 140m and the sub-circuit board 140s may be disposed below the bracket 130 and may be electrically connected with each other through a specified connector or a specified wiring The main and sub-circuit boards 140m and 140s may be, for example, implemented with rigid printed circuit boards (rigid PCBs). According to an embodiment, various electronic components, devices, printed circuits, or the like (e.g., a processor, a memory, a communication circuit, or the like) may be mounted or arranged on the main circuit board 140m and the sub-circuit board 140s. According to various embodiments, the main and sub-circuit boards 140m and 140s may be referred to as "main board", "printed board assembly (PBA)" or simply "PCB."

The rear housing 150 may be disposed below the circuit board 140 and encompass elements of the electronic device 101. The rear housing 150 may form a side appearance of the electronic device 101. The rear housing 150 may be referred to as "rear case" or "rear plate". The rear housing 150 may include an area not exposed out of the electronic device 101 and an area exposed to an outer side surface of the electronic device 101. For example, the area that is not exposed out of the electronic device 101 may include a plastic injection molded product. The area exposed to the outer side surface of the electronic device 101 may include metal. The area exposed to the outer side surface and including metal may be referred to as "metallic bezel". According to an embodiment, at least a portion of the metallic bezel may be utilized as an antenna radiator to transceive a signal having a specified frequency.

The battery 160 may convert chemical energy to electrical energy or electrical energy to chemical energy. For example, the battery 160 may convert chemical energy to electrical energy and may supply the electrical energy to various elements or modules mounted in the display 120 and on the circuit board 140. In addition, the battery 160 may convert electrical energy, which is supplied from the outside, to chemical energy and may store the chemical energy therein. According to an embodiment, the circuit board 140 may include a power management module to manage charging/discharging of the battery 160.

The back cover 170 may be coupled to a rear surface of the electronic device 101. The back cover 170 may be formed of tempered glass, a plastic injection molded product, and/or metal. According to various embodiments, the back cover 170 may be implemented integrally with the rear housing 150 or may be implemented detachably from the rear housing 150 by a user.

Figure 2:
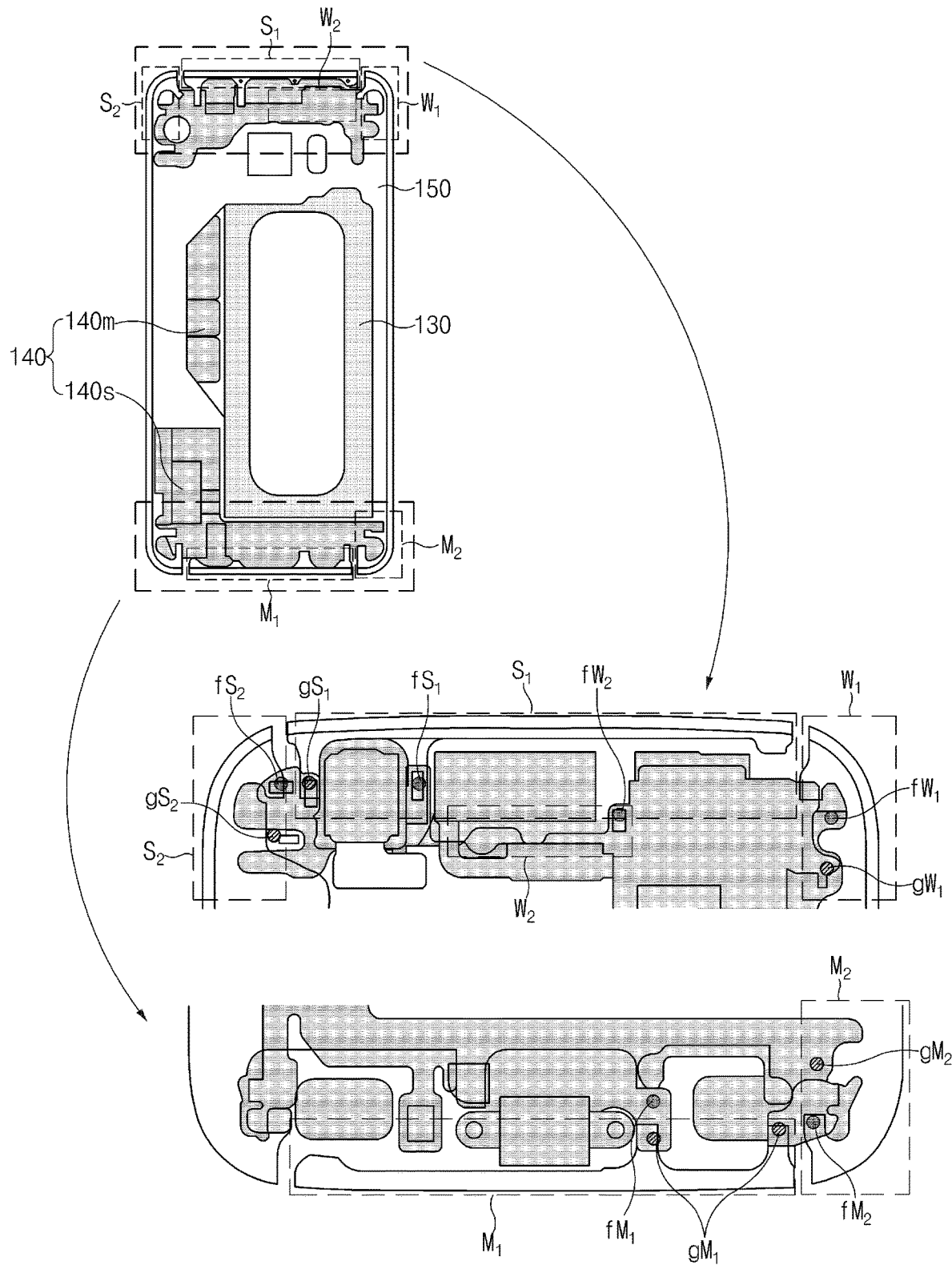
FIG. 2 illustrates the arrangement of an antenna mounted in the electronic device, according to an embodiment of the present disclosure.

FIG. 2 illustrates the arrangement of an antenna mounted in the electronic device, according to an embodiment.

Referring to FIG. 2, an assembly of the bracket 130, the circuit board 140, and the rear housing 150 is illustrated. According to an embodiment, the electronic device may include a plurality of antennas.

According to an embodiment, a first sub-antenna S1, a second sub-antenna S2, a first Wi-Fi antenna W1, and a second Wi-Fi antenna W2 may be disposed at an upper portion of the electronic device. At least one antenna disposed at the upper portion of the electronic device may be referred to as "upper antenna".

The first sub-antenna S1 may be configured to transmit or receive a signal making resonance in a low band (LB) and/or a mid-band (MB). For example, the first sub-antenna S1 may be configured to transmit or receive a signal in at least one of E-UTRA B12, B29, B13, B17, B26, B5, B2, and B4 specified by 3GPP TS 36.101. A radiator of the first sub-antenna S1 may include an upper side metallic frame of the rear housing 150 of the electronic device and/or an LDS conductive pattern formed on the rear housing 150. The radiator may be electrically connected with a feeding point fS1 and a ground point gS1.

The second sub-antenna S2 may be configured to transmit or receive a signal making resonance in the MB, a high band (HB), and/or a global positioning system (GPS) frequency band. For example, the second sub-antenna S2 may be configured to transmit or receive a signal in at least one of E-UTRA B25, B2, B4, B30, B7, and B41 specified by 3GPP TS 36.101. The radiator of the second sub-antenna S2 may include a left side (or a right side) metallic frame of the rear housing 150 of the electronic device and/or an LDS conductive pattern formed on the rear housing 150. The radiator may be electrically connected with the feeding point fS2 and the ground point gS2.

The first Wi-Fi antenna W1 and the second Wi-Fi antenna W2 may be configured to transmit or receive a signal making resonance in a frequency band (e.g., a 2.4 GHz and/or 5 GHz band) specified by IEEE 802.11. The radiator of the first Wi-Fi antenna W1 may include a right side (or left side) metallic frame of the rear housing 150 of the electronic device and/or an LDS conductive pattern formed on the rear housing 150. The radiator of the first Wi-Fi antenna W1 may be electrically connected with the feeding point fW1 and the ground point gW1. The radiator of the second Wi-Fi antenna W2 may include an LDS conductive pattern formed on the rear housing 150 of the electronic device. The radiator of the second Wi-Fi antenna W2 may be electrically connected with the feeding point fW2.

According to an embodiment, a first main antenna M1 and a second main antenna M2 may be disposed at a lower portion of the electronic device. At least one antenna disposed at the lower portion of the electronic device may be referred to as "lower antenna".

The first main antenna M1 may be configured to transmit or receive a signal making resonance in the LB and/or the MB. For example, the first main antenna M1 may be configured to transmit or receive a signal in at least one of E-UTRA B12, B29, B13, B26, B20, B5, B8, B3, B25, B2, B4, and B1 specified by 3GPP TS 36.101. The radiator of the first main antenna M1 may include a lower side metallic frame of the rear housing 150 of the electronic device and/or an LDS conductive pattern formed on the rear housing 150. The radiator may be electrically connected with the feeding point fM1 and the ground point gM1.

The second main antenna M2 may be configured to transmit or receive a signal making resonance in the MB and/or the HB. For example, the second main antenna M2 may be configured to transmit or receive a signal in at least one of E-UTRA B2, B1, B4, B30, B41, and B7 specified by 3GPP TS 36.101. The radiator of the second main antenna M2 may include a right side (or a left side) metallic frame of the rear housing 150 of the electronic device and/or an LDS conductive pattern formed on the rear housing 150. The radiator may be electrically connected with the feeding point fM2 and the ground point gM2.

Figure 3:
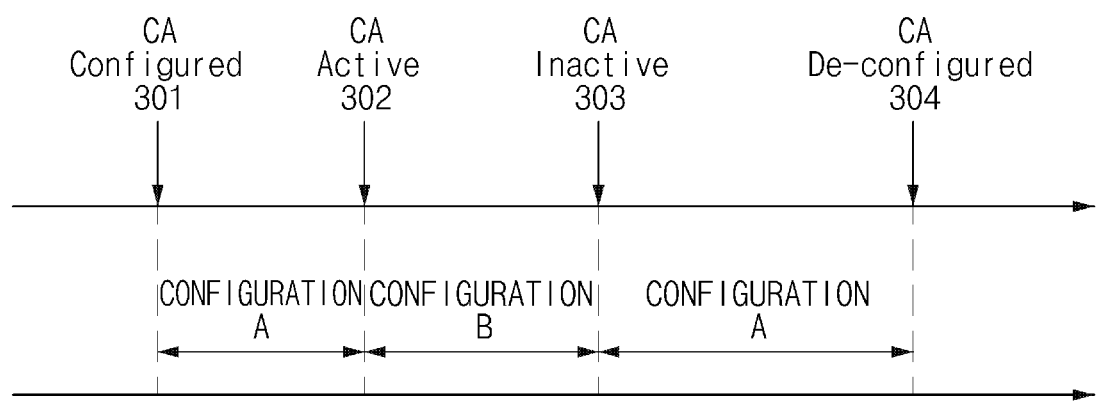
FIG. 3 is a view illustrating a communication operation of the electronic device, according to an embodiment of the present disclosure.

FIG. 3 is a view illustrating a communication mode (or a communication state) of the electronic device, according to an embodiment.

Referring to FIG. 3, according to an embodiment, the electronic device may receive various control signals from a base station allowing the electronic device to access a network. The base station may be variously referred to as, for example, an "advanced base station (ABS)", a "Node-B (NB)", an "evolved-NodeB (eNB)", a "base transceiver system (BTS)", or a "processing server (PS)" according to communication protocols of the network.

According to an embodiment, the electronic device may receive a "CA configured" signal 301, which represents that the network supports carrier aggregation (CA), from the base station.

Even though the "CA configured" signal 301 is received, the electronic device may make standalone communication by using a single frequency band until receiving a "CA active" signal 302. In this case, the electronic device may configure the antenna and/or the communication circuit to Configuration A optimized to the standalone communication.

The electronic device may receive the "CA active (or a CA activate)" signal 302, which indicates the initiation of CA communication, from the base station. After receiving the "CA active" signal 302, the electronic device may configure the antenna and/or the communication circuit to Configuration B optimized to a CA operation. According to an embodiment, the electronic device may maintain existing configuration during a predetermined time as described later with reference to FIGS. 4A to 4C.

According to an embodiment, the electronic device may receive a "CA inactive" (or a "CA deactivate") signal 303, which indicates the stopping of the CA communication, from the base station. After receiving the "CA inactive" signal 303, the electronic device may configure the antenna and/or the communication circuit to Configuration A optimized to the standalone communication. According to an embodiment, the electronic device may maintain existing configuration during a predetermined time as described later with reference to FIGS. 4A to 4C.

According to an embodiment, the electronic device may receive a "CA de-configured" (or an Scell delete) signal 304, which releases the CA configuration, from the base station. After the "CA de-configured" signal 304 is received, the existing Configuration A may be maintained.

Figure 4A:
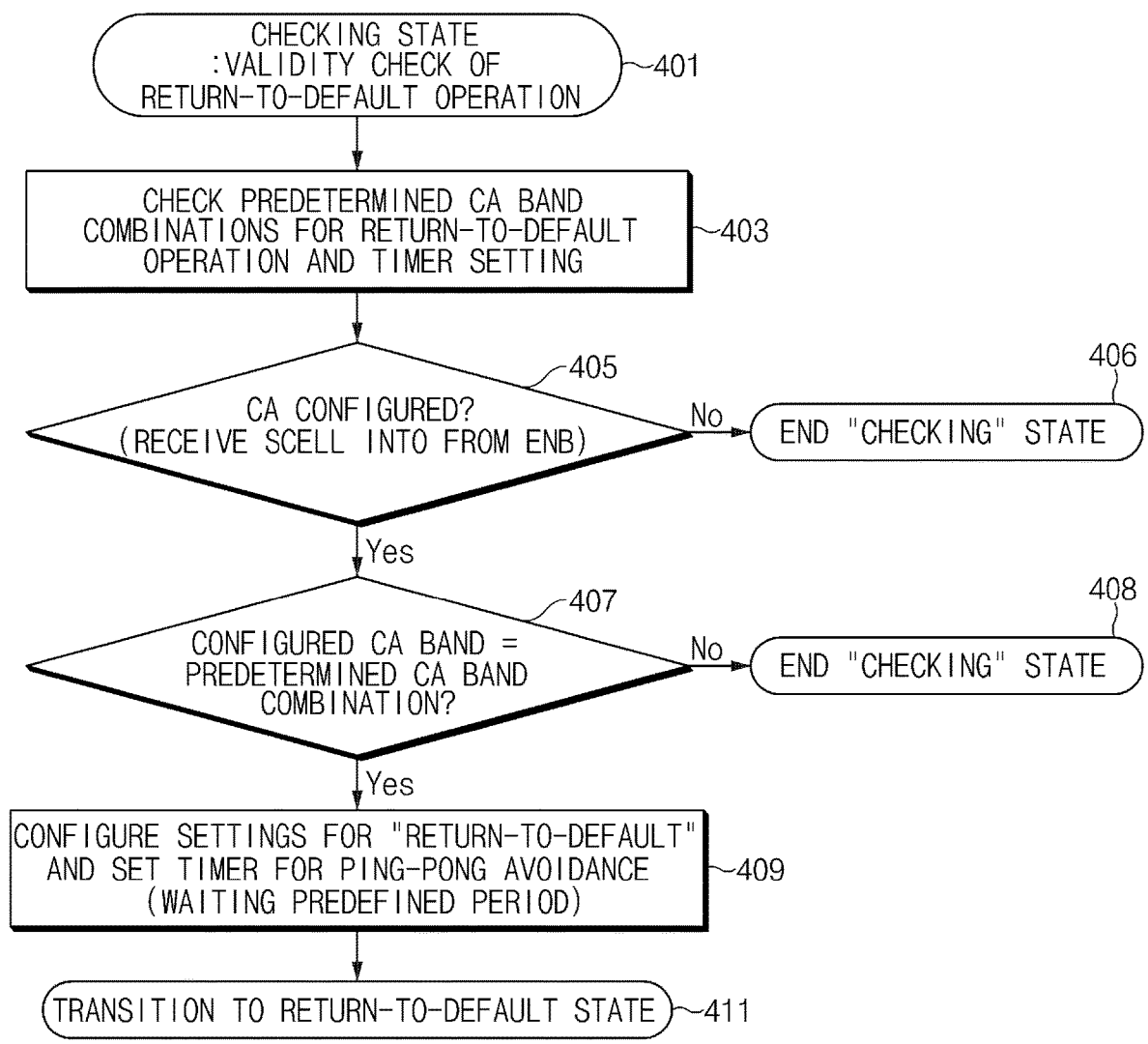
FIGS. 4A, 4B and 4C are flowcharts illustrating the operation of the electronic device, according to an embodiment of the present disclosure.
Figure 4B:
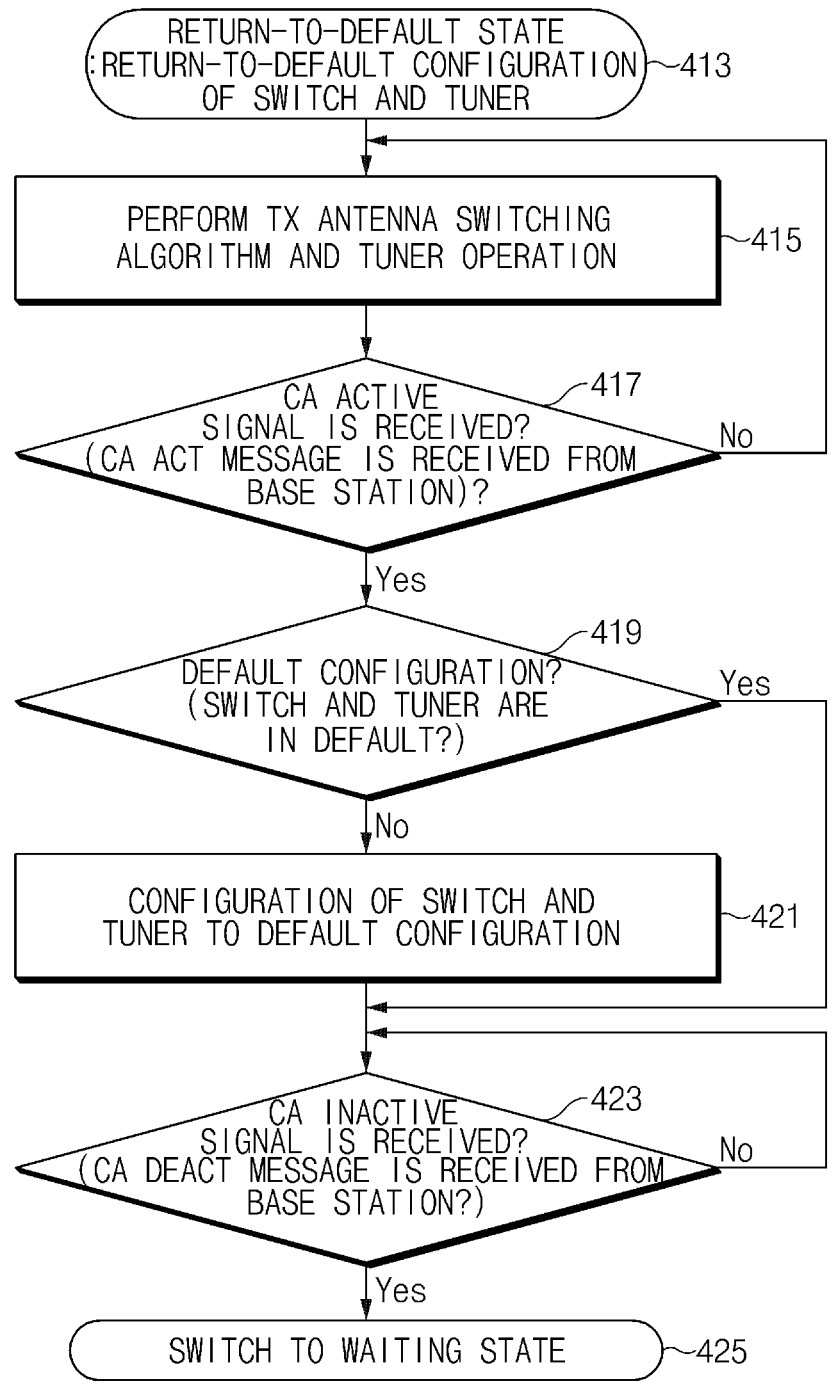
Figure 4C:
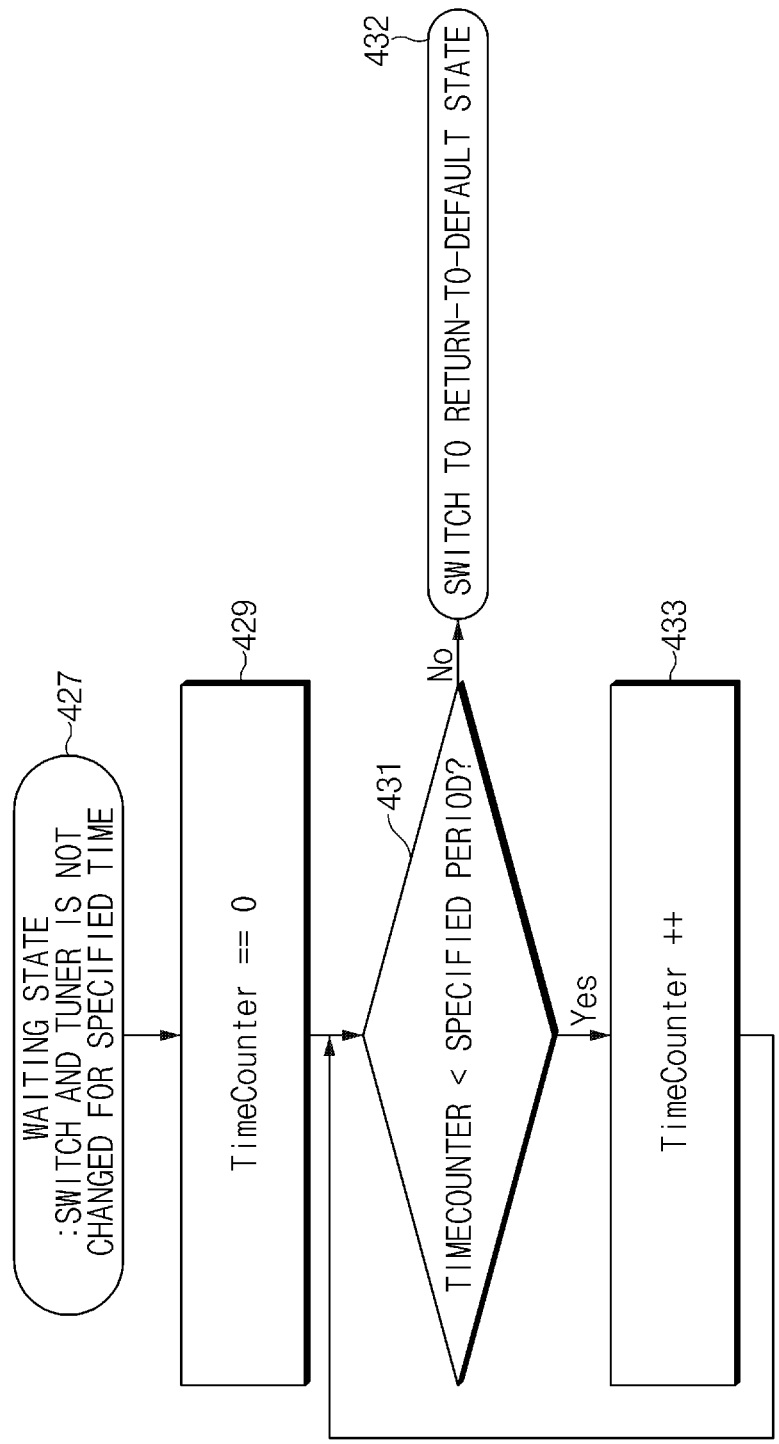

FIGS. 4A to 4C are flowcharts illustrating the operation of the electronic device, according to an embodiment.

Referring to FIG. 4A, according to an embodiment, the electronic device may be present in a "Checking" state. In the "Checking" state, the configuration of the antenna and/or the communication circuit of the electronic device may be ready to support a "Return-to-Default" operation. The "Return-to-Default" operation may represent configuring the antenna and/or the communication circuit during the operation in the CA mode (e.g., during the period for Configuration B in FIG. 3). Configuring the antenna and/or the communication circuit during the operation in modes except the CA mode may include adjusting an antenna impedance tuner and an aperture switch, switching for upper and lower antennas, or performing a 4RXD operation of antennas.

In operation 401, the electronic device may initiate the "Checking" state to check the validity of the "Return-to-Default" operation, that is, to check whether to be able to perform the "Return-to-Default" operation.

In operation 403, the electronic device may check the combination of CA bands for the "Return-to-Default" operation and timer setting.

In operation 405, the electronic device may determine whether the "CA configured" signal is received. For example, the "CA configured" signal may be included in secondary cell (Scell) information received from the base station. If it is determined, in operation 405, that the "CA configured" signal is received, the procedure may proceed to operation 407, and, otherwise, may proceed to operation 406.

If the "CA configured" signal is not received, since the electronic device is present under the execution of the "Return-to-Default" operation, the electronic device may end the "Checking" state in operation 406.

If the "CA configured" signal is received, the electronic device may determine, in operation 407, whether CA bands provided from the base station are matched with the combination of CA bands supported by the antenna/communication circuit. If the CA bands provided from the base station are matched with the combination of CA bands supported by the antenna/communication circuit, the procedure may proceed to operation 409, and, otherwise, may proceed to operation 408.

In operation 408, since the CA bands provided from the base station are not matched with the combination of CA bands supported by the antenna/communication circuit, the electronic device may operate, for example, through primary cell component carrier (PCC) standalone communication regardless of the CA state and may end the "Checking" state.

In operation 409, since the CA bands provided from the base station are matched with the combination of the CA bands supported by the antenna/communication circuit, the electronic device may configure settings for the "Return-to-Default" operation and may set a timer to avoid a ping-pong phenomenon (a transition phenomenon to a CA active state or a CA inactive state at an interval of several tens of msec).

As illustrated in FIG. 4B, the electronic device may make transition to a "Return-to-Default" state in operation 411.

Referring to FIG. 4B, the electronic device may initiate the "Return-to-Default" state in operation 413. The "Return-to-Default" state may represent a state that the electronic device performs the "Return-to-Default" operation.

In operation 415, the electronic device may execute an antenna switching algorithm and a tuner operation. The configuring the antenna and/or the communication circuit of the electronic device may include adjusting an antenna impedance tuner and an aperture switch, switching for upper and lower antennas, or performing a 4RXD operation of antennas.

In operation 417, the electronic device may identify whether the "CA active" signal is received. The reception of a "CA active" signal may be identified based on a CA ACT message received from the base station. If the "CA active" signal is not received, the procedure may return to operation 415. If the "CA active" signal is received, the procedure may proceed to operation 419.

In operation 419, the electronic device may determine whether the antenna/communication circuit currently operates with CA default configuration. The electronic device may determine whether the configuration of the current antenna/communication circuit is appropriate to performing the CA operation (mode). If the configuration of the current antenna/communication circuit is appropriate to performing the CA operation (mode), the procedure may proceed to operation 423, and, otherwise, may proceed to operation 421.

Since the configuration of the current antenna/communication circuit is not appropriate to performing the CA operation, the electronic device may change the configuration of the switch or the tuner included in the antenna and the configuration of the communication circuit to the CA default configuration in operation 421 to be appropriate to performing the CA (mode) operation.

In operation 423, the electronic device may identify the reception of the "CA inactive" signal based on a CA DEACT message received from the base station. If the "CA inactive" signal is not received, the procedure may repeat operation 423. If the "CA inactive" signal is received, the procedure may proceed to operation 425.

In operation 425, the electronic device may make transition to a waiting state as illustrated in FIG. 4C.

Referring to FIG. 4C, according to an embodiment, the electronic device may be present in a waiting state. If the electronic device receives the "CA active" signal or the "CA inactive" signal in the waiting state, the electronic device may maintain the operating mode thereof and/or radio frequency (RF) setting for a time measured by the timer. For example, if the time interval between the reception of the "CA active" signal and the reception of the "CA inactive" signal is within several tens of msec which represents a shorter time, since the configuration of the antenna and/or the communication circuit (e.g., the setting of the switch and the tuner) has to be changed within the time of several tens of msec, data packet loss may occur. Thus, according to an embodiment, the electronic device may be maintained in an existing state of an initiation state or a stop state of the CA operation by the antenna and/or the communication circuit using a timer (or a counter) to reduce the data packet loss. For example, the electronic device may perform operations 427 to 433.

In operation 427, the electronic device may initiate the waiting state. If the electronic device receives the "CA active" signal, and has the configuration of the antenna and/or the communication circuit, which is changed to that for the CA operation, time measurement by the timer may be initiated.

In operation 429, the electronic device may set an initial value of "TimeCounter" to '0' (TimeCounter=0).

In operation 431, the electronic device may determine, at a specified time interval, whether the "TimeCounter" is within a specified period value. If the "TimerCounter" is within the specified period value, the procedure may proceed to operation 433, and, otherwise, may proceed to operation 432.

In operation 432, since the "TimeCounter" is not within the specified period value, that is, since the "TimerCounter" arrives at the specified period value, the electronic device may make transition to the "Return-to-Default" state illustrated in FIG. 4B. If the electronic device receives the "CA inactive" signal in the "Return-to-Default" state, the electronic device may change to the configuration of the antenna and/or the communication circuit corresponding to the "CA inactive" signal.

In operation 433, since the TimeCounter is within the specified period value, the "TimeCounter" may be increased by "1" (TimeCounter ++). In this case, the electronic device may maintain the configuration of the antenna and/or the communication circuit to that for the CA operation even if the "CA inactive" signal is received.

Figure 5:
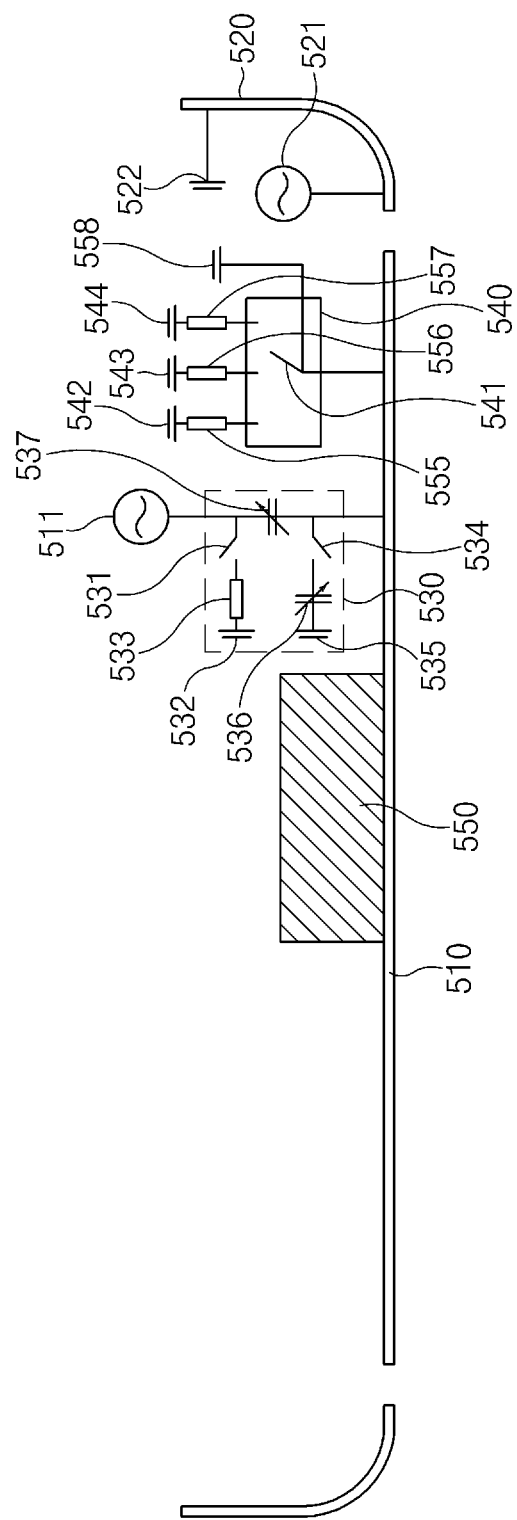
FIG. 5 is a view illustrating antenna tuning, according to an embodiment of the present disclosure.

FIG. 5 is a view illustrating antenna tuning, according to an embodiment.

Referring to FIG. 5, according to an embodiment, the antenna of the electronic device is illustrated. For example, the antenna may include the first main antenna M1 and the second main antenna M2 illustrated in FIG. 2.

According to an embodiment, the first main antenna M1 designed to transceive a signal in an LB and/or MB may include a lower metallic frame 510, a first feeding point 511, a tuner 530, an aperture switch 540, a plurality of grounds 542, 543, 544, and 558, or a plurality of lumped elements 555, 556, and 557 For example, a universal serial bus (USB) port 550 may be disposed adjacent to the lower metallic frame 510.

According to an embodiment, the tuner 530 may be interposed between the lower metallic frame 510 and the first feeding point 511. According to an embodiment, the tuner 530 may include a switch 531, a ground 532, a lumped element 533, a switch 534, a ground 535, a variable capacitor 536, and a variable capacitor 537. For example, the first feeding point 511 may be series-connected with the ground 532 while interposing the switch 531 and the lumped element 533 between the first feeding point 511 and the ground 532. The first feeding point 511 may be connected with the lower metallic frame 510 while interposing the variable capacitor 537 between the first feeding point 511 and the lower metallic frame 510. At a node between the lower metallic frame 510 and the variable capacitor 537, the lower metallic frame 510 may be series-connected with the ground 535 while interposing the switch 534 and the variable capacitor 536 between the lower metallic frame 510 and the ground 535.

According to an embodiment, the lower metallic frame 510 may be connected with a plurality of grounds 542, 543, 544, and 558 while interposing the aperture switch 540 between the lower metallic frame 510 and the grounds 542, 543, 544, and 558. The lower metallic frame 510 may be connected with the grounds 542, 543, and 544 through the relevant lumped elements 555, 556, and 557 according to the connection of the aperture switch 540. In the case that the aperture switch 540 is open, the lower metallic frame 510 may be connected with the ground 558.

According to an embodiment, the second main antenna M2 designed to transceive a signal in a HB may include a right-sided (or left-sided) metallic frame 520, a second feeding point 521, and a ground 522. For example, the right-sided (or left-sided) metallic frame 520 may be connected with the second feeding point 521 and the ground 522.

According to an embodiment, a processor (e.g., an application processor (AP) or a communication processor (CP)) of the electronic device may control the tuner 530 or the aperture switch 540 and/or control capacitance of the variable capacitors 536 and 537, according to operating modes (e.g., a standalone mode and a CA operation mode) or a frequency band of a transceived signal.

For example, in the standalone communication based on the LB, the electronic device may set capacitance values of the variable capacitors 536 and 537 in the tuner 530 of the first main antenna M1 to specified values or may control an open/close location of the aperture switch 540 to enhance communication quality in the LB. For example, in the CA communication based on the LB and the HB, the electronic device may set values, which are different from values set for the standalone communication based on the LB, as the capacitance values of the variable capacitors 536 and 537, or may change the open/close location of the aperture switch 540 for the standalone communication based on the LB.

For example, in the standalone communication based on the LB, the electronic device may set capacitance values of the variable capacitors 536 and 537 in the tuner 530 of the first main antenna M1 to specified values or may control an open/close location of the aperture switch 540 to enhance communication quality in the LB. The signal in the HB may be transceived together with the second main antenna M2 including the right-sided (or left-sided) metallic frame 520. Since the tuner and/or the switch capable of adjusting the impedance of the antenna is disposed in the first main antenna M1, the second main antenna M2 may be indirectly tuned through the tuning of the first main antenna M1. This is because the radiation operation of the second main antenna M2 is affected by the radiation operation of the first main antenna M1 (so-called, "detune").

According to an embodiment, in the CA communication based on the LB and the HB (e.g., if a "CA active" signal is received), the processor (e.g., AP or CP) of the electronic device may control the tuner 530 and/or the aperture switch 540 to adjust an impedance value of at least one antenna. For example, the processor may set the capacitance values of the variable capacitors 536 and 537 to a value, which is appropriate to the setting for the CA communication based on the LB and the HB instead of the setting for the standalone communication based on the LB, which is previously set for the first main antenna M1. Alternatively, the processor may change the open/close location of the aperture switch 540 for the relevant CA communication.

Figure 6A:
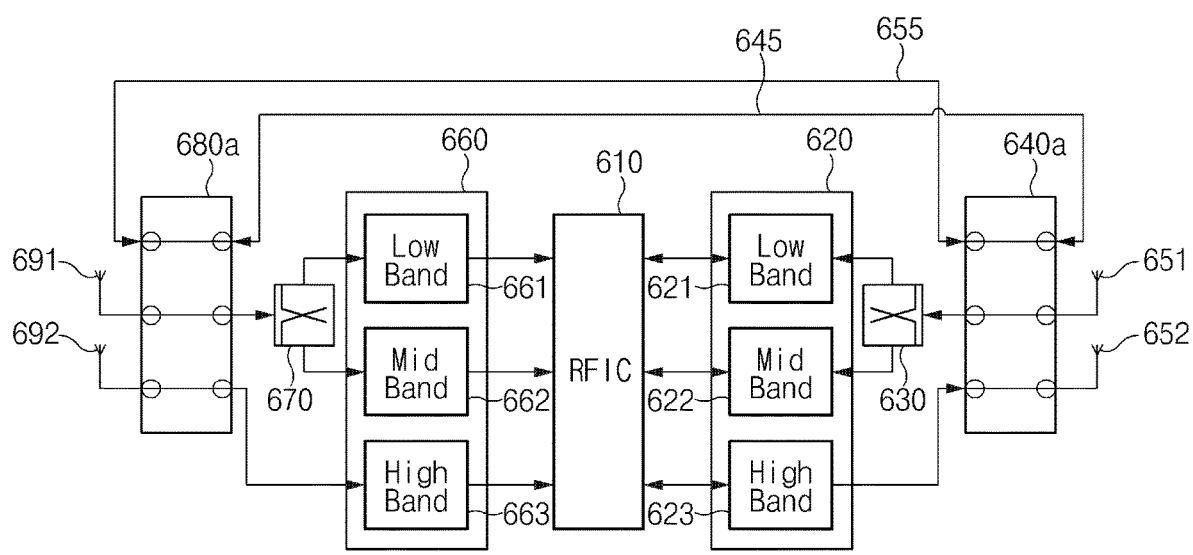
FIGS. 6A, 6B, and 6C are views illustrating a communication circuit and an antenna of the electronic device, according to an embodiment of the present disclosure.
Figure 6B:
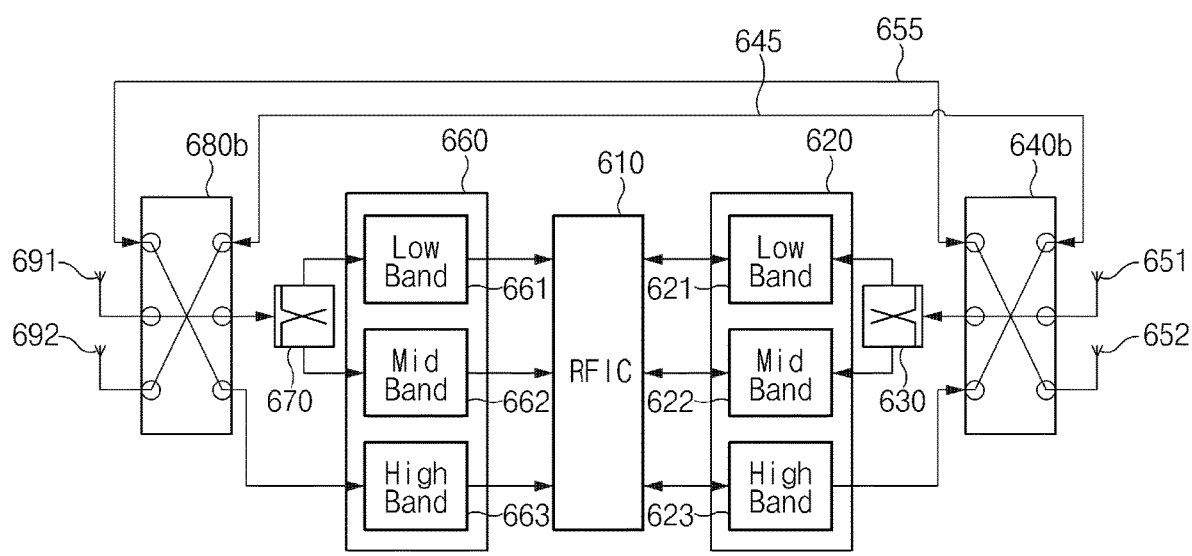
Figure 6C:
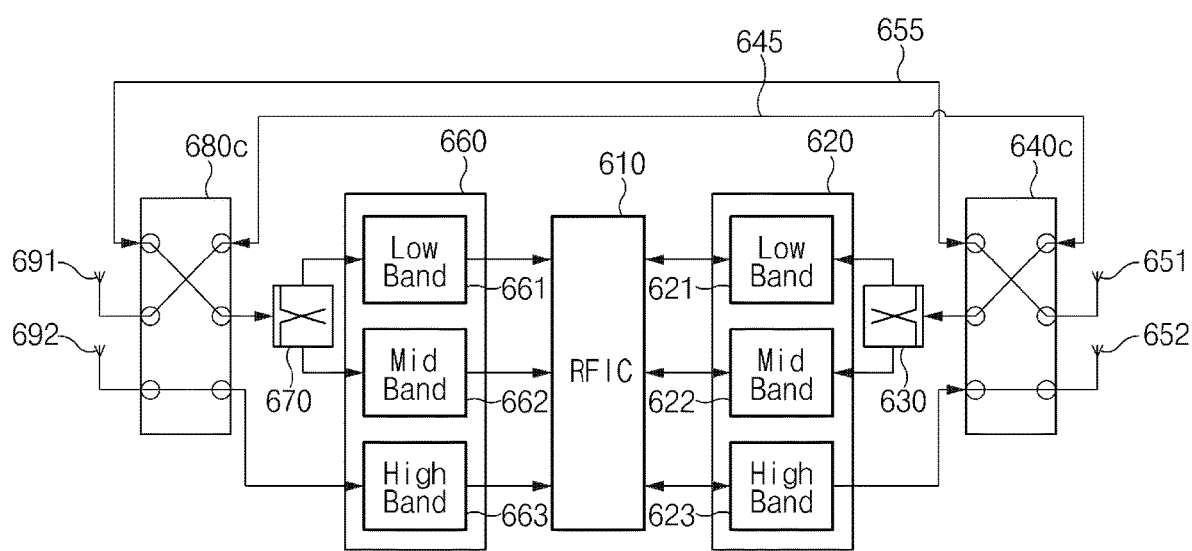

FIGS. 6A to 6C are views illustrating the communication circuit and the antenna of the electronic device, according to an embodiment.

Referring to FIG. 6A, according to an embodiment, the electronic device may include an RF circuit (RFIC) 610, a main antenna RF front end (RFFE) circuit 620, a main antenna diplexer 630, a main antenna switch 640a, a first main antenna 651, a second main antenna 652, a sub-antenna RFFE circuit 660, a sub-antenna diplexer 670, a sub-antenna switch 680a, a first sub-antenna 691, and a second sub-antenna 692. Among the above elements, the RFIC 610, the main antenna RFFE circuit 620, the main antenna diplexer 630, the main antenna switch 640a, the sub-antenna RFFE circuit 660, the sub-antenna diplexer 670, and the sub-antenna switch 680a may be included in a communication circuit.

The RFIC 610 may process a signal, which is transceived through at least one of the first and second main antennas 651 and 652, and the first and second sub-antennas 691 and 692, based on a frequency band of the signal. For example, the RFIC 610 may convert, under to control of the processor (e.g., AP or CP), a signal having various bands, which are received through the first and second main antennas 651 and 652 and the first and second sub-antennas 691 and 692, into a baseband signal or may convert a baseband signal to be transmitted into a signal having various bands.

The main antenna RFFE circuit 620 may include a transmitter (Tx) and a primary receiver (PRx) for signals of LB, MB, and HB. For example, the main antenna RFFE circuit 620 may include a LB handler 621, an MB handler 622, and a HB handler 623. Each of the LB handler 621, the MB handler 622, and the HB handler 623 may respectively include a power amplifier module (PAM) and a low-noise amplifier (LNA). The PAMs of LB handler 621, MB handler 622 and HB handler 623 may amplify the power of a signal to be transmitted to another electronic device (e.g., a base station) through a network (e.g., a cellular network). The LNAs of LB handler 621, MB handler 622 and HB handler 623 may amplify the power of a signal received through the network such that the signal is able to be processed by the RFIC 610.

The main antenna diplexer 630 has one side connected with the LB handler 621 and the MB handler 622 in the main antenna RFFE circuit 620 and an opposite side connected with any one terminal of the main antenna switch 640a. The main antenna diplexer 630 may be a signal splitting filter element for transceiving an LB signal and an MB signal at the same time or different times. The main antenna diplexer 630 may be variously modified according to the settings of the communication circuit and/or an antenna structure. For example, the main antenna diplexer 630 may be connected with the MB handler 622 and the HB handler 623 in the main antenna RFFE circuit 620 and may be connected with another terminal of the main antenna switch 640a. For example, the main antenna diplexer 630 may be connected with the LB handler 621 and the HB handler 623 in the main antenna RFFE circuit 620 and may be connected with another terminal of the main antenna switch 640a.

The main antenna switch 640a may connect the main antenna RFFE circuit 620 with the first and second main antennas 651 and 652 through the main antenna diplexer 630 (or without passing through the main antenna diplexer 630). In FIG. 6A, the main antenna switch 640a is illustrated in the form of a 3P3T (3 pole, 3 throw) switch, but the embodiment is not limited thereto. The main antenna switch 640a may be implemented in the form of an xPyT (x pole, y throw) switch depending on the configuration of the main antenna RFFE circuit 620 or the number of main antennas. A path of transceiving signals in the LB, the MB and/or the HB may be established according to internal connection structures of the main antenna switch 640a.

The first main antenna 651 and the second main antenna 652 may correspond to the first main antenna M1 and the second main antenna M2 disposed at the lower portion of the electronic device illustrated in FIG. 2, respectively. The first main antenna 651 may be configured to transmit or receive a signal making resonance in the LB and/or the MB. The second main antenna 652 may be configured to transmit or receive a signal making resonance in the MB and/or the HB.

The sub-antenna RFFE circuit 660 may include a diversity receiver (PRx) circuit. For example, the sub-antenna RFFE circuit 660 may include a LB handler 661, an MB handler 662, and a HB handler 663. The LNAs included in the LB handler 661, the MB handler 662, and the HB handler 663 may amplify the power of a signal received through the network such that the signal is able to be processed by the RFIC 610.

The sub-antenna diplexer 670 has one side connected with the LB handler 661 and the MB handler 662 in the sub-antenna RFFE circuit 660 and an opposite side connected with any one terminal of the sub-antenna switch 680a. The sub-antenna diplexer 670 may be a signal splitting filter element for transceiving an LB signal and an MB signal at the same time or different times. The sub-antenna diplexer 670 may have various modifications depending on the configuration of the communication circuit and/or the antenna structure. For example, the sub-antenna diplexer 670 may be connected with the MB handler 662 and the HB handler 663 in the sub-antenna RFFE circuit 660 and may be connected with another terminal of the sub-antenna switch 680a. Alternatively, the sub-antenna diplexer 670 may be connected with the LB handler 661 and the HB handler 663 in the sub-antenna RFFE circuit 660 and may be connected with another terminal of the sub-antenna switch 680a.

The sub-antenna switch 680a may connect the sub-antenna RFFE circuit 660 with the sub-antennas 691 and 692 through the sub-antenna diplexer 670 (or without passing through the sub-antenna diplexer 670). In FIG. 6A, the sub-antenna switch 680a is illustrated in the form of a 3P3T (3 pole, 3 throw) switch, but the embodiment is not limited thereto. The sub-antenna switch 680a may be implemented in the form of an xPyT (x pole, y throw) switch depending on the configuration of the sub-antenna RFFE circuit 660 or the number of sub-antennas. A path of transceiving signals in the LB, the MB and/or the HB may be established according to internal connection structures of the sub-antenna switch 680a.

The first sub-antenna 691 and the second sub-antenna 692 may correspond to the first sub-antenna S1 and the second sub-antenna S2 disposed at the upper portion of the electronic device illustrated in FIG. 2, respectively. The first sub-antenna 691 may be configured to transmit or receive a signal making resonance in the LB and/or the MB. The second sub-antenna 692 may be configured to transmit or receive a signal making resonance in the MB, the HB, and/or a GPS frequency band.

An electrical path 645 may connect any one terminal of the main antenna switch 640a with any one terminal of the sub-antenna switch 680a. The electrical path 645 may be implemented with a coaxial cable or a conductive pattern formed on a printed circuit board (PBC)/flexible PCB (FPCB). According to an embodiment, the electrical path 645 may correspond to a path that a signal is delivered from any one terminal of the main antenna switch 640a to any one terminal of the sub-antenna switch 680a.

An electrical path 655 may connect any one terminal of the main antenna switch 640a with any one terminal of the sub-antenna switch 680a. The electrical path 655 may be implemented with a coaxial cable or a conductive pattern formed on a PBC/FPCB. According to an embodiment, the electrical path 655 may correspond to a path that a signal is delivered from any one terminal of the main antenna switch 680a to any one terminal of the main antenna switch 640a.

According to an embodiment, the main antenna switch 640a and the sub-antenna switch 680a may connect the main (or sub) antennas with the RFIC 610 according to the connection structure illustrated in FIG. 6A.

According to an embodiment, a signal transmitted to or received from the first main antenna 651 may make resonance in the LB and/or the MB. The signal may be delivered to the main antenna diplexer 630 through the main antenna switch 640a. In the main antenna diplexer 630, the signal may be split into an LB signal and an MB signal. The split signal may be converted into a baseband signal by the RFIC 610 after being amplified by the main antenna RFFE circuit 620. According to various embodiments, in the case of transmitting the signal through the first main antenna 651, the electronic device may operate in the sequence reverse to the above-described signal processing path.

According to an embodiment, the signal transmitted or received through the second main antenna 652 may make resonance in a HB. The signal may be delivered to the main antenna RFFE circuit 620 through the main antenna switch

640*a*, and may be amplified by the main antenna RFFE circuit 620. The signal may be converted into a baseband signal by the RFIC 610. According to various embodiments, in the case of transmitting the signal through the second main antenna 652, the electronic device may operate in the sequence reverse to the above-described signal processing path.

According to an embodiment, a signal transmitted to or received from the first sub-antenna 691 may make resonance in the LB and/or the MB. The signal may be delivered to the sub-antenna diplexer 670 through the sub-antenna switch 680*a*. In the sub-antenna diplexer 670, the signal may be split into an LB signal and an MB signal. The split signal may be converted into a baseband signal by the RFIC 610 after being amplified by the sub-antenna RFFE circuit 660. According to various embodiments, in the case of transmitting the signal through the first sub-antenna 691, the electronic device may operate in the sequence reverse to the above-described signal processing path.

According to an embodiment, the signal transmitted or received through the second sub-antenna 692 may make resonance in a HB. The signal may be delivered to the sub-antenna RFFE circuit 660 through the sub-antenna switch 680*a*, and may be amplified by the sub-antenna RFFE circuit 660. Thereafter, the signal may be converted into a baseband signal by the RFIC 610. According to various embodiments, in the case of transmitting the signal through the second sub-antenna 692, the electronic device may perform operations in the sequence reverse to the above-described signal processing path.

According to various embodiments, the coupling structure of the main antenna switch 640*a* and the coupling structure of the sub-antenna switch 680*a* are not illustrated in FIG. 6A. For example, main antenna switches 640*b* and 640*c* and sub-antenna switches 680*b* and 680*c* may be possible as illustrated in FIGS. 6B and 6C.

Referring to FIG. 6B, an electronic device according to an embodiment is illustrated. The electronic device illustrated in FIG. 6B has a configuration similar to that of the electronic device illustrated in FIG. 6A. In the following description, the details of the same or similar reference numerals will be omitted to avoid redundancy.

According to an embodiment, the main antenna switch 640*b* and the sub-antenna switch 680*b* may connect the main (or sub) antennas with the RFIC 610 according to the connection structure illustrated in FIG. 6B.

According to an embodiment, a signal transmitted to or received from the first main antenna 651 may make resonance in the LB and/or the MB. The signal may be delivered to the main antenna diplexer 630 through the main antenna switch 640*b*. In the main antenna diplexer 630, the signal may be split into an LB signal and an MB signal. The split signal may be converted into a baseband signal by the RFIC 610 after being amplified by the main antenna RFFE circuit 620. According to various embodiments, in the case of transmitting the signal through the first main antenna 651, the electronic device may perform operations in the sequence reverse to the above-described signal processing path.

According to an embodiment, the signal transmitted or received through the second main antenna 652 may make resonance in a HB. The signal may be delivered to the sub-antenna switch 680*b* through the main antenna switch 640*b* and the electrical path 655. The signal may be delivered to the sub-antenna RFFE circuit 660 from the sub-antenna switch 680*b*, and may be amplified by the sub-antenna RFFE circuit 660. The signal may be converted into a baseband signal by the RFIC 610. According to various embodiments, in the case of transmitting the signal through the second main antenna 652, the electronic device may operate in the sequence reverse to the above-described signal processing path.

According to an embodiment, a signal transmitted to or received from the first sub-antenna 691 may make resonance in the LB and/or the MB. The signal may be delivered to the sub-antenna diplexer 670 through the sub-antenna switch 680*b*. In the sub-antenna diplexer 670, the signal may be split into an LB signal and an MB signal. The split signal may be converted into a baseband signal by the RFIC 610 after being amplified by the sub-antenna RFFE circuit 660. According to various embodiments, in the case of transmitting the signal through the first sub-antenna 691, the electronic device may perform operations in the sequence reverse to the above-described signal processing path.

According to an embodiment, the signal transmitted or received through the second sub-antenna 692 may make resonance in the HB. The signal may be delivered to the main antenna switch 640*b* through the sub-antenna switch 680*b* and the electrical path 645. The signal may be delivered to the main antenna RFFE circuit 620 from the main antenna switch 640*b*, and may be amplified by the main antenna RFFE circuit 620. The signal may be converted into a baseband signal by the RFIC 610. According to various embodiments, in the case of transmitting the signal through the second sub-antenna 692, the electronic device may perform operations in the sequence reverse to the above-described signal processing path.

Referring to FIG. 6C, an electronic device according to an embodiment is illustrated. The electronic device illustrated in FIG. 6C has a configuration similar to that of the electronic device illustrated in FIG. 6A. In the following description, the details of the same or similar reference numerals will be omitted to avoid redundancy.

According to an embodiment, the main antenna switch 640*c* and the sub-antenna switch 680*c* may connect the main (or sub) antennas with the RFIC 610 according to the connection structure illustrated in FIG. 6C.

According to an embodiment, a signal transmitted to or received from the first main antenna 651 may make resonance in an LB and/or an MB. The signal may be delivered to the sub-antenna switch 680*c* through the main antenna switch 640*c* and the electrical path 655. The signal may be delivered to the sub-antenna diplexer 670 from the sub-antenna switch 680*c*. In the sub-antenna diplexer 670, the signal may be split into an LB signal and an MB signal. The split signal may be converted into a baseband signal by the RFIC 610 after being amplified by the sub-antenna RFFE circuit 660. According to various embodiments, in the case of transmitting the signal through the first main antenna 651, the electronic device may perform operations in the sequence reverse to the above-described signal processing path.

According to an embodiment, the signal transmitted or received through the second main antenna 652 may make resonance in a HB. The signal may be delivered to the main antenna RFFE circuit 620 through the main antenna switch 640*c*. The signal may be amplified by the main antenna RFFE circuit 620. The signal may be converted into a baseband signal by the RFIC 610. According to various embodiments, in the case of transmitting the signal through the second main antenna 652, the electronic device may perform operations in the sequence reverse to the above-described signal processing path.

According to an embodiment, a signal transmitted to or received from the first sub-antenna 691 may make resonance in the LB and/or the MB. The signal may be delivered to the main antenna switch 640c through the sub-antenna switch 680c and the electrical path 645. The signal may be delivered to the main antenna diplexer 630 from the main antenna switch 640c. In the main antenna diplexer 630, the signal may be split into an LB signal and an MB signal. The split signal may be converted into a baseband signal by the RFIC 610 after being amplified by the main antenna RFFE circuit 620. According to various embodiments, in the case of transmitting the signal through the first sub-antenna 691, the electronic device may perform operations in the sequence reverse to the above-described signal processing path.

According to an embodiment, the signal transmitted or received through the second sub-antenna 692 may make resonance in a HB. The signal may be delivered to the sub-antenna RFFE circuit 660 through the sub-antenna switch 680c. The signal may be amplified by the sub-antenna RFFE circuit 660. The signal may be converted into a baseband signal by the RFIC 610. According to various embodiments, in the case of transmitting the signal through the second sub-antenna 692, the electronic device may perform operations in the sequence reverse to the above-described signal processing path.

Figure 7A:
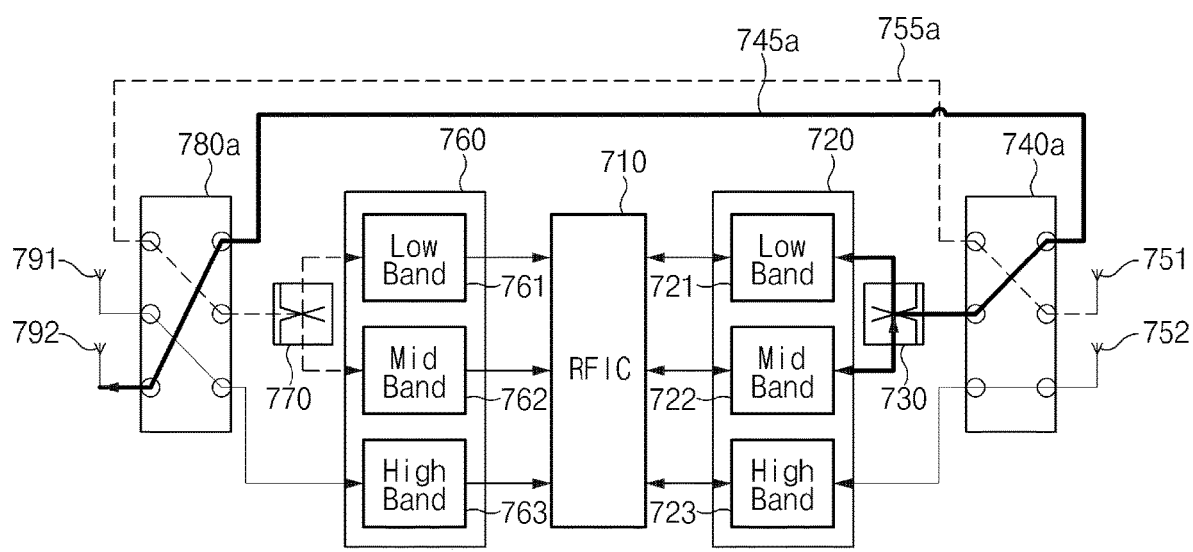
FIGS. 7A and 7B are views illustrating antenna switching, according to an embodiment of the present disclosure.
Figure 7B:
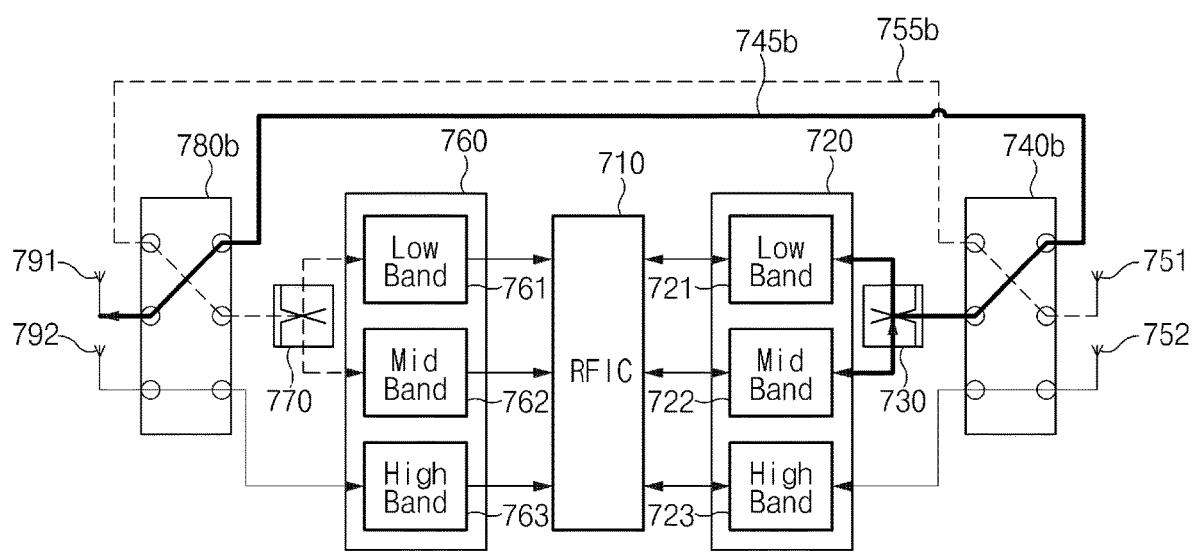

FIGS. 7A and 7B are views illustrating antenna switching, according to an embodiment.

Referring to FIGS. 7A and 7B, an antenna structure of the electronic device is illustrated in the case that the electronic device receives a "CA configured" signal from a base station and receives a "CA inactive" signal from the base station. In the electronic device, antenna switching may be performed between main antennas 751 and 752 and sub-antennas 791 and 792. In the following description, the details of some elements, which are illustrated in FIG. 6A, among elements illustrated in FIGS. 7A and 7B may be omitted.

According to an embodiment, a main antenna switch 740a and a sub-antenna switch 780a may connect the main (or sub) antennas with an RFIC 710 according to the connection structure illustrated in FIG. 7A.

According to an embodiment, a signal transmitted to or received from the first main antenna 751 may make resonance in an LB and/or an MB. The signal may be delivered to the sub-antenna switch 780a through the main antenna switch 740a and an electrical path 755a. The signal may be delivered to a sub-antenna diplexer 770 from the sub-antenna switch 780a. In the sub-antenna diplexer 770, the signal may be split into an LB signal and an MB signal. The split signal may be converted into a baseband signal by the RFIC 710 after being amplified by a sub-antenna RFFE circuit 760. According to various embodiments, in the case of transmitting the signal through the first main antenna 751, the electronic device may perform operations in the sequence reverse to the above-described signal processing path.

According to an embodiment, a signal transmitted or received through the second main antenna 752 may make resonance in a HB. The signal may be delivered to a main antenna RFFE circuit 720 through the main antenna switch 740a. The signal may be amplified by the main antenna RFFE circuit 720. The signal may be converted into a baseband signal by the RFIC 710. According to various embodiments, in the case of transmitting the signal through the second main antenna 752, the electronic device may operate in the sequence reverse to the above-described signal processing path.

According to an embodiment, in a first sub-antenna 791, a HB signal may be transceived with higher quality as compared with those of the LB signal and the MB signal. The HB signal may be delivered to the sub-antenna RFFE circuit 760 through the sub-antenna switch 780a. The HB signal may be converted into a baseband signal by the RFIC 710 after being amplified by the sub-antenna RFFE circuit 760. According to various embodiments, in the case of transmitting the signal through the first sub-antenna 791, the electronic device may perform operations in the sequence reverse to the above-described signal processing path.

According to an embodiment, in the second sub-antenna 792, LB and MB signals may be transceived with higher quality as compared with that of the HB signal. The LB and MB signals may be delivered to the main antenna switch 740a through the sub-antenna switch 780a and an electrical path 745a. The LB and MB signals may be delivered to a main antenna diplexer 730 from the main antenna switch 740a. The main antenna diplexer 730 may split the received signal into the LB signal and the MB signal. The split signal may be converted into a baseband signal by the RFIC 710 after being amplified by the main antenna RFFE circuit 720. According to various embodiments, in the case of transmitting the signal through the second sub-antenna 792, the electronic device may perform operations in the sequence reverse to the above-described signal processing path.

According to an embodiment, a main antenna switch 740b and the sub-antenna switch 780b may connect the main (or sub) antennas with the RFIC 710 according to the connection structure illustrated in FIG. 7B.

According to an embodiment, a signal transmitted to or received from the first main antenna 751 may make resonance in the LB and/or the MB. The signal may be delivered to the sub-antenna switch 780b through the main antenna switch 740b and an electrical path 755b. The signal may be delivered to the sub-antenna diplexer 770 from the sub-antenna switch 780b. In the sub-antenna diplexer 770, the signal may be split into an LB signal and an MB signal. The split signal may be converted into a baseband signal by the RFIC 710 after being amplified by the sub-antenna RFFE circuit 760. According to various embodiments, in the case of transmitting the signal through the first main antenna 751, the electronic device may operate in the sequence reverse to the above-described signal processing path.

According to an embodiment, the signal transmitted or received through the second main antenna 752 may make resonance in the HB. The signal may be delivered to the main antenna RFFE circuit 720 through the main antenna switch 740b. The signal may be amplified by the main antenna RFFE circuit 720. The signal may be converted into a baseband signal by the RFIC 710. According to various embodiments, in the case of transmitting the signal through the second main antenna 752, the electronic device may operate in the sequence reverse to the above-described signal processing path.

According to an embodiment, a signal transmitted to or received from the first sub-antenna 791 may make resonance in the LB and/or the MB. The signal may be delivered to the main antenna switch 740b through the sub-antenna switch 780b and the electrical path 745b. The signal may be delivered to the main antenna diplexer 730 from the main antenna switch 740b. In the main antenna diplexer 730, the signal may be split into an LB signal and an MB signal. The split signal may be converted into a baseband signal by the RFIC 710 after being amplified by the main antenna RFFE circuit 720. According to various embodiments, in the case of transmitting the signal through the first sub-antenna 791, the electronic device may perform operations in the sequence reverse to the above-described signal processing path.

According to an embodiment, the signal transmitted or received through the second sub-antenna 792 may make resonance in a HB. The signal may be delivered to the sub-antenna diplexer 760 through the sub-antenna switch 780b. The signal may be amplified by the sub-antenna RFFE circuit 760. The signal may be converted into a baseband signal by the RFIC 710. According to various embodiments, in the case of transmitting the signal through the second sub-antenna 792, the electronic device may perform operations in the sequence reverse to the above-described signal processing path.

According to an embodiment, in the case that the "CA inactive" signal is received even though a "CA configured" signal is received with respect to the LB and the MB, a CA operation may be performed between the LB and the MB or between the MB and HB. The operation may be determined based on the quality (e.g., reference signal received power (RSRP)) of the LB signal transmitted and received by the sub-antennas 791 and 792. To this end, the antenna for transceiving the LB signal may be switched.

For example, on the assumption that the LB signal is delivered to the first sub-antenna 791 in the antenna switching for the LB signal and the MB signal, if the quality of the MB signal in the first sub-antenna 791 fails to satisfy the quality required for the CA operation, the antenna for transceiving the LB signal may not perform the CA operation. In addition, in the case that switching has been already made for the LB signal, if the "CA active" signal is received, switching may be made for the CA operation.

According to another embodiment, although "CA configured" signals for the LB and the MB are received, in the case that a "CA inactive" signal is received, a CA operation may be performed between the LB and the MB or between the MB and HB. The operation may be determined based on the quality (e.g., reference signal received power (RSRP)) of the MB signal received by the sub-antennas 791 and 792. To this end, the antenna for transceiving the MB signal may be switched.

For example, on the assumption that the MB signal is delivered to the second sub-antenna 792 in the antenna switching for the MB signal and the HB signal, if the quality of the HB signal in the second sub-antenna 792 fails to satisfy the quality required for a CA operation, the antenna for transceiving the HB signal may not perform the CA operation.

Alternatively, on the assumption that the MB signal is delivered to the second sub-antenna 792 in the antenna switching for the MB signal and the HB signal, if the quality of the HB signal in the second sub-antenna 792 fails to satisfy the quality required for a CA operation, but the first sub-antenna 791 represents the sufficient quality to perform the CA operation between the MB signal and the HB signal, the antenna switching may be made to the first sub-antenna 791. In this case, if the second sub-antenna 792 satisfies an antenna switching condition in a standalone operation based on only a MB, and a "CA active" signal is received with respect to the MB and the HB, the antenna switching for the MB may be made to the first sub-antenna 791 instead of the second sub-antenna 792 (switching to the CA operation).

According to various embodiments, an antenna for transceiving a HB signal may be switched in a scheme defined based on signal quality.

According to an embodiment, the electronic device may receive signals in various frequency bands from the four antennas 751, 752, 791, and 792, in addition to the antenna switching.

According to an embodiment, a transceiving (TRx) path for the antenna switching may be defined (so-called, swap). The switching of the transceiving (TRx) path may be determined depending on a specified algorithm. For example, the electronic device may determine communication quality of four antennas 751, 752, 791, and 792 and may switch an antenna at a receiver side, which represents the most excellent quality. The determination cycle of the communication quality may be dynamically set depending on system stability and a current level. The electronic device may periodically or continuously determine the communication quality of the transceiving (TRx) path for swap-back. The switching of the transceiving (TRx) path may be determined depending on a specified algorithm. In this case, the remaining three antennas except the antenna that contributes to the transceiving (TRx) path may continuously receive a signal.

According to an embodiment, in the case that the antenna switching is made and signals are received through the four antennas 751, 752, 791, and 792 (wherein, a transmitting path and a receiving path are separated from each other), the antenna switching may be referred to as the 4RXD switching. In this case, receiving signal tracking (Rx tracking) may be periodically or continuously performed along a path the same as the transmitting path.

According to an embodiment, in the case that the electronic device receives signals through the four antennas 751, 752, 791, and 792, operations after the reception of a "CA active" signal and the operations after the reception of a "CA inactive" signal are as follows. For example, in the case of performing the CA operation between the MB and the HB, on the assumption that the MB signal is delivered to the second sub-antenna 792, if the quality of the LB signal in the second sub-antenna 792 fails to satisfy the quality required for a CA operation, but the first sub-antenna 791 satisfies the condition of performing the CA operation between the MB and the HB, antenna switching may be made to the first sub-antenna 791 to perform the CA operation between the MB and the HB. In this case, a 4RXD path for the CA operation or the stopping of the CA operation may be redefined by using the switches 740a and 740b, and 780a and 780b.

According to embodiments of this disclosure, the configuration of the antenna and/or the communication circuit may be changed based on the "CA active" signal or the "CA inactive" signal, thereby optimizing the performance of the electronic device in the CA operation and the standalone operation.

As described above, according to an embodiment, an electronic device may include a communication circuit, a plurality of antennas that are fed with power from the communication circuit, and a processor that controls the communication circuit. The processor is configured to receive a first signal for indicating operation initiation of configuration for carrier aggregation, and change configuration of at least one of the antennas or the communication circuit to perform the carrier aggregation if a second signal for indicating initiation of the carrier aggregation is received from a base station.

According to an embodiment, the processor may change the configuration of the at least one of the antennas or the communication circuit after a specified time elapses from a time point that the second signal is received.

According to an embodiment, the processor may change an impedance of the at least one of the antennas to a specified value to perform the carrier aggregation, if the second signal is received.

According to an embodiment, the electronic device may further include a tuner that changes an impedance of the at least one of the antennas to a specified value to perform the carrier aggregation if the second signal is received.

According to an embodiment, the tuner may include a variable capacitor and/or a switch to change a capacitance of the variable capacitor or to open or close the switch such that the impedance is set to the specified value.

According to an embodiment, the impedance may be set to the specified value as the capacitance is changed by using the variable capacitor or the switch is open or closed.

According to an embodiment, the processor may configure settings of the at least one of the antennas or the communication circuit to perform a standalone operation if the second signal is not received.

According to an embodiment, the processor may configure the settings of the antennas or the communication circuit to receive signals having the same frequencies from the antennas, if the second signal is not received.

According to an embodiment, the standalone operation may include an operation of making communication by using a signal frequency band.

According to an embodiment, the antennas may include: a first group of antenna disposed at an upper portion of the electronic device and a second group of antenna disposed at a lower portion of the electronic device.

According to an embodiment, the processor may reconfigure an internal electrical path of the communication circuit such that the first group of antenna and the second group of antenna perform the carrier aggregation if the second signal is received.

According to an embodiment, the processor may configure an internal electrical path of the communication circuit such that the first group of antenna and the second group of antenna perform the standalone operation, if the first signal is received and the second signal is not received.

According to an embodiment, the processor may configure an internal electrical path of the communication circuit such that switching is made between the first group of antenna and the second group of antenna, if the first signal is received and the second signal is not received.

According to an embodiment, each of the first group of antenna and the second group of antenna may include a plurality of antennas. Antenna switching may be made one of the antennas included in the first group of antenna and one of the antennas included in the second group of antenna based on a parameter representing communication quality.

According to an embodiment, the parameter representing the communication quality may include reference signal received power (RSRP).

According to an embodiment, the first signal may correspond to a "CA configured" signal, and the second signal may correspond to a "CA active" signal.

According to an embodiment, an electronic device may include a communication circuit, a plurality of antennas that are fed with power from the communication circuit, a processor that controls the communication circuit, and a memory electrically connected with the processor. The memory may store instructions that, when executed, cause the processor to receive a first signal for indicating initiation of configuration for carrier aggregation through the communication circuit, and change configuration of at least one of the antennas or the communication circuit to perform the carrier aggregation if a second signal for indicating operation initiation of the carrier aggregation is received from a base station.

According to an embodiment, a communication method of an electronic device may include receiving a first signal for indicating initiation of configuration for carrier aggregation, and changing configuration of at least one of the antennas or the communication circuit to perform the carrier aggregation if a second signal for indicating operation initiation of the carrier aggregation is received from a base station.

According to an embodiment, the changing of the configuration may be performed after a specified time elapses from a time point that the second signal is received.

According to an embodiment, the changing of the configuration may include changing an impedance of the at least one of the antennas to a specified value to perform the carrier aggregation.

According to an embodiment, the communication method may further include configuring the at least one of the antennas or the communication circuit to perform a standalone operation if the second signal is not received.

According to an embodiment, the communication method may further include configuring the at least one of the antennas or the communication circuit to receive signals having the same frequencies from the antennas, if the second signal is not received.

According to an embodiment, the antennas may include: a first group of antenna disposed at an upper portion of the electronic device and a second group of antenna disposed at a lower portion of the electronic device. In this case, the changing of the configuration includes reconfiguring an internal electrical path of the communication circuit such that the first group of antenna and the second group of antenna perform the carrier aggregation.

Each of the above-mentioned elements of the electronic device according to various embodiments described in this disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor, may cause the one or more processors to perform a function corresponding to the instruction. The computer-readable storage media, for example, may be the memory.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in this disclosure, the configuration of the antenna and/or the communication circuit may be changed based on the "CA active" signal or the "CA inactive" signal, thereby optimizing the performance of the electronic device in the CA operation and the standalone operation. In addition, a variety of effects directly or indirectly understood through this disclosure may be provided.

While this disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
a communication circuit;
a plurality of antennas electrically connected to the communication circuit; and
a processor configured to control the communication circuit, wherein the processor is configured to:
receive a first signal from a base station, the first signal indicates a network supports carrier aggregation,
after receiving the first signal, communicate with the base station using a single frequency band,
receive a second signal from the base station after the first signal is received, the second signal indicates initiation of the carrier aggregation or deactivation of the carrier aggregation,
in response to receiving the second signal indicating the initiation of the carrier aggregation, change a configuration of a switch or a tuner included in at least one antenna, of the plurality of antennas, and a configuration of the communication circuit to perform the carrier aggregation, and
in response to receiving the second signal indicating the deactivation of the carrier aggregation, maintain the configuration of the switch or the tuner and the configuration of the communication circuit.

2. The electronic device of claim 1, wherein the processor is configured to change the configuration of the switch or the tuner included in the at least one antenna and the configuration of the communication circuit after a specified time elapses after the second signal is received.

3. The electronic device of claim 1, further comprising:
after the second signal is received, the tuner is configured to change an impedance of the at least one antenna to a specified value to perform the carrier aggregation.

4. The electronic device of claim 3, wherein the tuner includes at least one of a variable capacitor or the switch, and wherein the tuner is configured to set the impedance to the specified value by changing a capacitance of the variable capacitor, opening the switch, or closing the switch.

5. The electronic device of claim 1, wherein the processor is configured to configure the at least one antenna or the communication circuit to perform a standalone operation if the second signal is not received.

6. The electronic device of claim 1, wherein the processor is configured to configure the at least one antenna or the communication circuit to receive signals comprising same frequencies from the plurality of antennas, if the second signal is not received.

7. The electronic device of claim 5, wherein the standalone operation includes an operation of making communication by using the single frequency band.

8. The electronic device of claim 1, wherein the plurality of antennas includes:
a first group of antennas disposed at an upper portion of the electronic device; and
a second group of antennas disposed at a lower portion of the electronic device.

9. The electronic device of claim 8, wherein the processor is configured to reconfigure an internal electrical path of the communication circuit such that the first group of antennas and the second group of antennas perform the carrier aggregation, if the second signal indicating the initiation of the carrier aggregation is received.

10. The electronic device of claim 8, wherein the processor is configured to configure an internal electrical path of the communication circuit such that the first group of antennas and the second group of antennas perform a standalone operation, if the first signal is received and the second signal is not received.

11. The electronic device of claim 8, wherein the processor is configured to configure an internal electrical path of the communication circuit, by switching between the first group of antennas and the second group of antennas, if the first signal is received and the second signal is not received.

12. The electronic device of claim 11, wherein the first group of antennas and the second group of antennas each include a portion of the plurality of antennas, and
wherein switching between one antenna included in the first group of antennas and another antenna included in the second group of antennas, is based on a parameter representing communication quality.

13. The electronic device of claim 12, wherein the parameter representing the communication quality includes reference signal received power (RSRP).

14. An electronic device comprising:
a communication circuit;
a plurality of antennas electrically connected to the communication circuit;

at least one processor configured to control the communication circuit; and a memory electrically connected with the at least one processor, wherein the memory is configured to store program code that, when executed by the at least one processor of the electronic device, cause the at least one processor to:
receive a first signal from a base station, the first signal indicates a network supports carrier aggregation, through the communication circuit;
after receiving the first signal, communicate with the base station using a single frequency band;
receive a second signal, from the base station after the first signal is received, the second signal indicates initiation of the carrier aggregation or deactivation of the carrier aggregation;
in response to receiving the second signal indicating the initiation of the carrier aggregation, change a configuration of a switch or a tuner included in at least one antenna, of the plurality of antennas, and a configuration of the communication circuit to perform the carrier aggregation; and
in response to receiving the second signal indicating the deactivation of the carrier aggregation, maintain the configuration of the switch or the tuner and the configuration of the communication circuit.

15. A communication method comprising:
receiving a first signal from a base station, the first signal indicates a network supports carrier aggregation;
after receiving the first signal, communicating with the base station using a single frequency band;
receiving a second signal, from the base station after the first signal is received, the second signal indicates initiation of the carrier aggregation or deactivation of the carrier aggregation;
in response to receiving the second signal indicating the initiation of the carrier aggregation, changing a configuration of a switch or a tuner included in at least one antenna, of a plurality of antennas, and a configuration of a communication circuit to perform the carrier aggregation; and
in response to receiving the second signal indicating the deactivation of the carrier aggregation, maintaining the configuration of the at least one of the antennas or the communication circuit.

16. The communication method of claim 15, wherein the changing of the configuration of the switch or the tuner and the configuration of the communication circuit is performed after a specified time elapses after the second signal is received.

17. The communication method of claim 15, wherein changing the configuration of the tuner includes changing an impedance of the at least one antenna to a specified value to perform the carrier aggregation.

18. The communication method of claim 15, further comprising:
configuring the at least one antenna or the communication circuit to perform a standalone operation, if the second signal is not received.

19. The communication method of claim 15, further comprising:
configuring the at least one antenna or the communication circuit to receive a signal from the plurality of antennas if the second signal is not received.

20. The communication method of claim 15, wherein the plurality of antennas includes:
a first group of antennas disposed at an upper portion of an electronic device; and
a second group of antennas disposed at a lower portion of the electronic device, and
wherein the changing of the configuration of the communication circuit includes reconfiguring an internal electrical path of the communication circuit such that the first group of antennas and the second group of antennas perform the carrier aggregation.

* * * * *